Dec. 6, 1966 A. R. FOREST 3,289,334

DISK TYPE CALCULATING AND DISPLAY DEVICE

Filed June 6, 1963 3 Sheets-Sheet 1

INVENTOR

ALEXANDER R. FOREST

BY Alan K. Roberts

ATTORNEY

Dec. 6, 1966 A. R. FOREST 3,289,334

DISK TYPE CALCULATING AND DISPLAY DEVICE

Filed June 6, 1963 3 Sheets-Sheet 2

INVENTOR.
ALEXANDER R. FOREST

BY Kenyon & Kenyon

ATTORNEYS

Dec. 6, 1966 A. R. FOREST 3,289,334

DISK TYPE CALCULATING AND DISPLAY DEVICE

Filed June 6, 1963 3 Sheets-Sheet 3

INVENTOR.
ALEXANDER R. FOREST
BY [signature]
ATTORNEY

United States Patent Office
3,289,334
Patented Dec. 6, 1966

3,289,334
DISK TYPE CALCULATING AND DISPLAY DEVICE
Alexander R. Forest, 551 5th Ave., New York, N.Y.
Filed June 6, 1963, Ser. No. 285,912
15 Claims. (Cl. 40—70)

This is a continuation-in-part of my copending application Ser. No. 654,133, filed April 22, 1957, and now forfeited which, in turn, is a continuation-in-part of my earlier application Ser. No. 534,592, filed Sept. 15, 1955 and now abandoned.

This invention relates to disk-type display devices and to supports for the same and more particularly to disk-type display devices comprising a plurality of disks which are independently rotatable about a common axis.

Calculating and display devices comprising a plurality of superimposed and rotatable disks are known. Such calculating and display devices, however, have required a center post or spindle extending through the common axis of the superimposed disks to hold them in position on the common axis.

In accord with my invention, I have provided a disk type calculating and display device which requires no central spindle or post to hold the plurality of superimposed disks in position along a common axis regardless of the amount of independent rotation of the disks. Instead the disks of my invention are so arranged and devised that each disk will interconnect itself with associated disks in such a manner that the disks remain in position as a unit on the common axis although each disk is susceptible of independent rotation.

This is achieved by providing each disk with a radial slit extending from a point on the circumference to the center thereof and by further providing each disk with a locking leaf. The locking leaf comprises a lip portion or segment integrally affixed to the disk and extending from one edge of the radial slit approximately one quarter of the distance around and below the disk. In other words, the locking leaf is an extension of the disk beyond its normal surface as generated by the rotation of the radius of the disk for 360°, the radius being generated an additional 90° to form the locking leaf. The locking leaf may also be considered as an additional quadrant of the disk, viz., a fifth quadrant located below the first quadrant thereof. The locking leaf of the uppermost disk is positioned below the bodies of all the other associated disks. The locking leaf of the second uppermost leaf is positioned below the bodies of the lower disks and below the locking leaf of the uppermost leaf. This arrangement is continued with all remaining lower disks. Thus the locking leaves serve to keep the disks in position on the common axis despite independent rotation of the disks.

Each disk is adapted to carry on its face advertising media, airline and train schedules with fares between cities, percentage charts and the like or any other material suitable for use with such a disk type device. There is no limit for the uses to which my device can be put.

Furthermore only size and thickness of each disk determine the maximum number of disks that may be employed in any individual device.

Tabs may be provided on the circumference of each disk to facilitate rotation of the disks. However, such tabs are not necessary to my device and may be considered as being optional.

Accordingly, it is a principal object of the present invention to provide a disk type calculating and display device comprising a plurality of superimposed and interleaved disks wherein each disk has a circular body portion, a radial slit and a lip portion integrally affixed to one edge of the radial slit, the lip portion defining a fifth quadrant of the disk.

It is a further object of the present invention to provide a display and calculating device comprising a plurality of superimposed, interleaved and independently rotatable disks wherein said disks are held in position along a central axis through their interleaving arrangement and without the aid of any central or spindle post.

It is yet another object of the present invention to provide a calculating and display device of the above described character which is formed of paper, plastic or any other relatively inexpensive material, which is simple to operate, inexpensive to manufacture and which has an attention and interest catching quality so that it may be used for advertising purposes.

It is a further object of the present invention to provide an improved support adapted for the support and display of the above-noted device without interfering with the movement of the disks.

Other objects and advantages of the present invention will become more apparent as it is described in detail below with particular reference to the accompanying drawings wherein.

Figure 1:
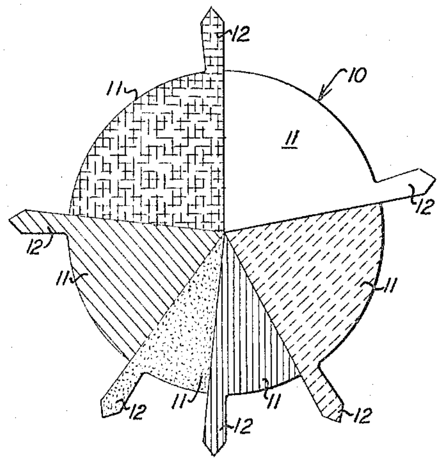
FIGURE 1 is a plan view of the novel calculating and display device of my invention, the particular device comprising five superimposed and independently rotatable disks.

With particular reference to FIG. 1, there is shown a disk type calculating and display device comprising a plurality of interleaved disks 11 with each disk having an outwardly extending tab 12 which is integrally affixed to its associated disk at the circumference thereof. The tabs 12 serve to facilitate independent rotation of each disk 11. However, rotation of each disk 11 may be readily accomplished without the tabs 12 by having the user manipulate the disks between his fingers.

Figure 2:
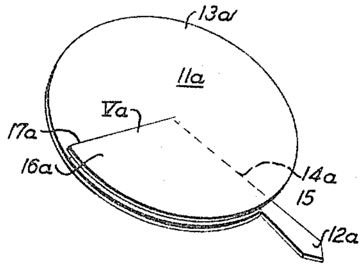
FIGURE 2 is a view in perspective of one of the disks used in my device, the disk being inverted so that the bottom face is uppermost.

In order that my invention may be more readily understood, I have described my device below with reference to two individual disks **11*a* and 11*b*, as seen in FIGS. 2 through 6. In FIG. 2, there is shown the disk 11*a*, which is in inverted position, and which comprises the circular body portion 13*a*. The body portion 13*a* may be considered as being a disk of five quadrants, the first quadrant $I^a$ being superimposed over and adjacent to the fifth quadrant $V^a$. In order to define the structure of the disk, the leading edge 14*a* is considered as the starting point for the radius which generates the disk. The radius is then generated through an angle of 360°, the first 90° of generation representing the first quadrant $I^a$. The radius is then further generated from 360° through 450° but just below the plane of the first quadrant $I^a$ thereby providing the fifth quadrant $V^a$. The fifth quadrant $V^a$ comprises the locking leaf 16*a***.

In one simple manner of making the disk **11*a*, the circular body portion 13*a* is slit radially as at 14*a*. A locking leaf 16*a* in the shape of a quadrant of the body portion 13*a* is affixed to one edge of the slit 14*a* so that it forms a fifth quadrant $V^a$ of the body portion lying just below the first quadrant $I^a$. The manner of joining locking leaf 16*a* to the edge of slit 14*a* may be conventional and is well within the knowledge of one skilled in the art. For example, an adhesive strip (not shown) may be employed along the under-surface of the locking leaf 16*a* and the body portion 13*a*** to join both together.

Figures 7, 9, 10, 11, 12:
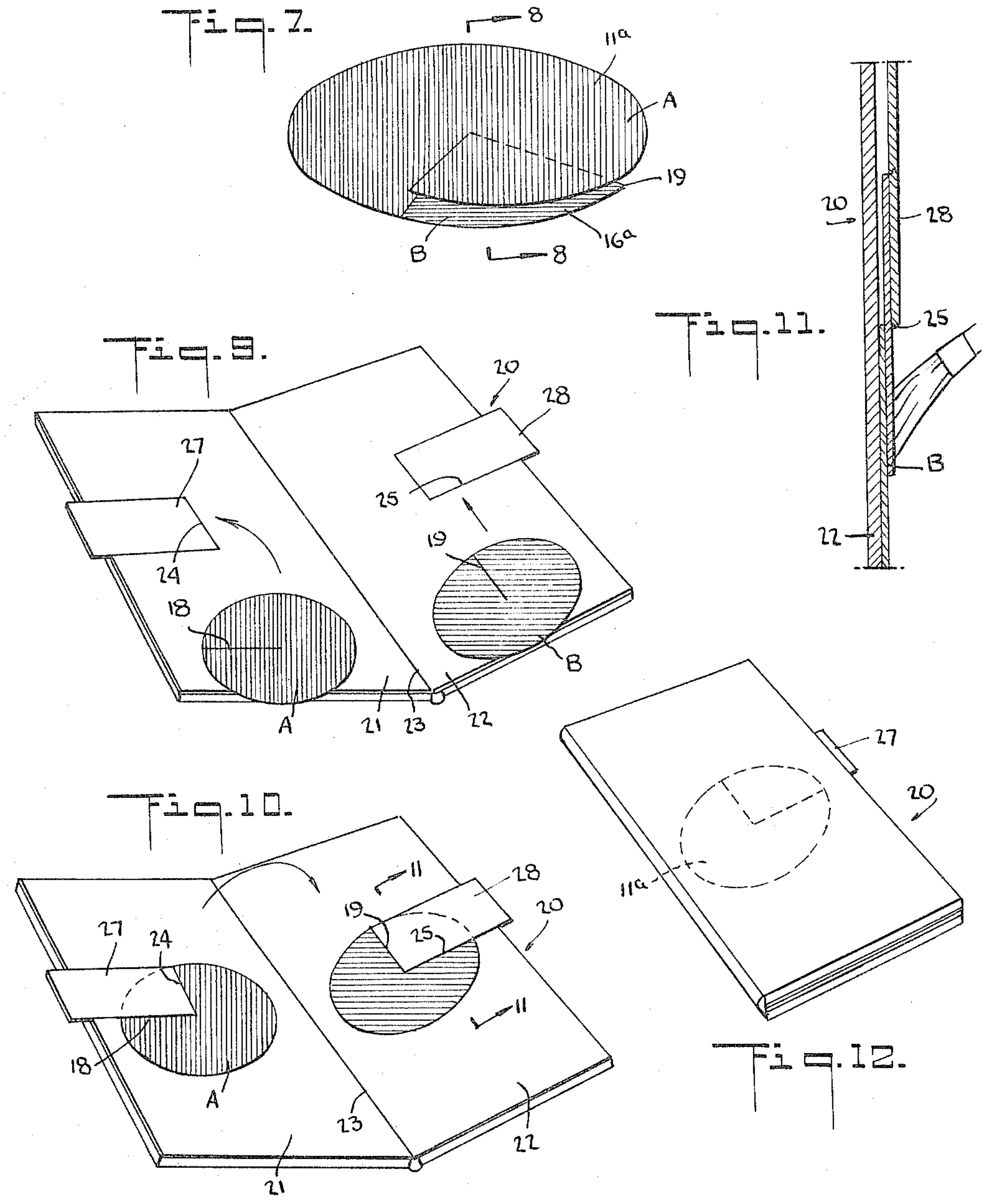
FIGURE 7 is a perspective view of another embodiment of one of the disks used in my device.
FIGURE 9 is a perspective view showing the first step in my method of manufacturing the laminated disk.
FIGURE 10 is a perspective view showing the laminae of the laminated disk in position to be glued together.
FIGURE 11 is a cross-sectional view taken on line 11—11 of FIG. 10 and showing the method of applying the binder or glue to the exposed surfaces of the laminae.
FIGURE 12 is a perspective view of the gluing device showing the method of manufacture step where the laminae are glued together.
Figure 8:
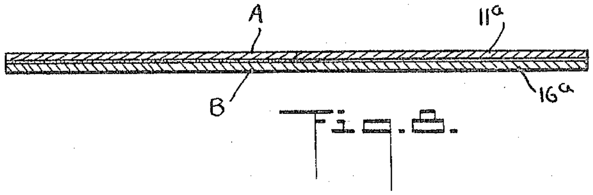
FIGURE 8 is a cross-sectional view taken on line 8—8 of FIG. 7.
Figure 15:
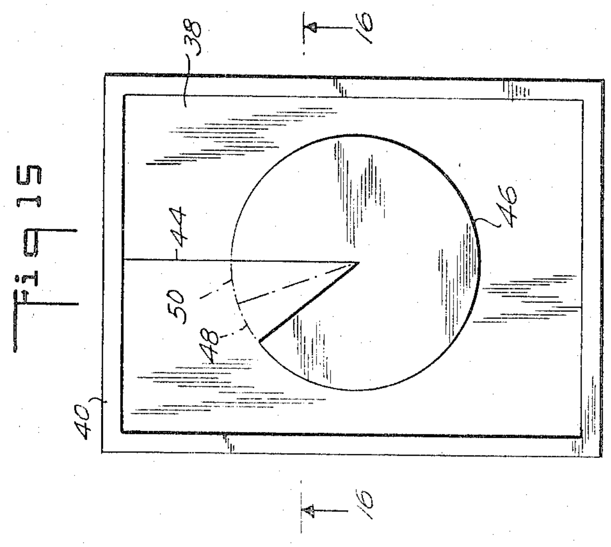
FIGURE 15 is a top plan view of the support showing how a disk can be engaged therewith.
Figure 14:
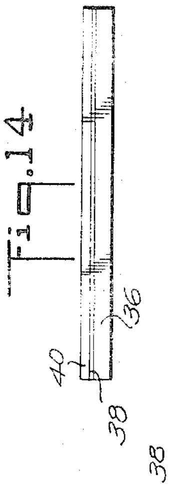
FIGURE 14 is an end view of said support.

Referring to FIGS 7 through 12, another embodiment of laminae **11*a* is shown which is made by bonding or gluing two disks A and B together in a particular manner as described below. In this embodiment, the disk 11*a* is formed by joining together two laminae A, B each having a radial slit 18, 19 respectively, extending from the circumference thereof to the center. Three quadrants of these laminae A, B are bonded or glued together, the slits 18, 19 having been displaced 90°. Thus, the quadrant between the slits 18, 19 is formed with two layers which are not bonded to one another and the other three quadrants of the disk are formed with the laminae A, B bonded together. As shown in FIG. 7, the resultant disk 11*a* (shown without a tab) is formed with a locking leaf 16*a* which comprises the portion of the lower lamina B extending beyond the slit 18 in the upper lamina A. The remaining quadrants of the disk 11*a* are formed with a double layer or lamina to provide a disk 11*a*** similar to the disk described above.

An advantage of this laminated disk **11*a***, as shown in FIGS. 7–12, resides in the fact that disks made in this manner can be readily provided with different colored opposing faces by simply using different colored laminae. This advantage is of particular interest where the user of the device wishes to make a multicolored presentation using one side of the device and be able to photograph this presentation in black and white by reversing the device and photographing blacks and whites or shadings thereof.

This laminated disk **11*a* shown in FIGS. 7–12 eliminates the necessity of bonding a locking leaf 16*a*** to the edge of the slit as described with respect to a single layer disk. It has been found that by eliminating this operation a much less expensive method of manufacturing the disk can be provided. This method of manufacturing will now be described.

This method is performed by utilizing a member 20 which has two wings or pages 21, 22 which are hingedly or foldably connected along a common edge at 23. Slots 24, 25 are provided in the wings 21, 22 respectively.

These slots are disposed perpendicularly to each other. As shown, slot 24 is disposed substantially parallel to the fold line 23 and slot 25 is disposed substantially perpendicular to this line. The lamina A is positioned with one quadrant extending through the slot 24 and the lamina B is likewise positioned with one quadrant extending through the slot 25 as shown in FIG. 10. Next, the exposed quadrants of one or both of the laminae 24, 25 are coated with a bonding material such as glue and the bonding device 20 if folded along fold line 23 to bring these exposed quadrants together. After the bonding operation is completed the laminated disk **11*a* is removed from the bonding device and is thus formed with three quadrants bonded together while the fourth quadrant, which was neither glued nor in contact during the bonding operation, is left in an unbonded condition. In order to facilitate the removal of the laminated disk 11*a* from the bonding device panels 27, 28 are slidably disposed in the wings 21, 22 respectively extending from the outer longitudinal edges thereof inwardly over the quadrants of the laminae A, B during the bonding operation. These panels 27, 28 are adapted to be slid outwardly by means such as an ordinary tongue in groove connection with the rest of the wings so that the bonded laminated disklike member may be readily removed from the bonding device 20**.

Figure 3:
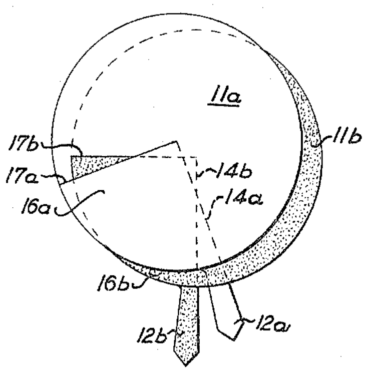
FIGURE 3 is a bottom view showing two of the disks in a partially interleaved position.
Figure 4:
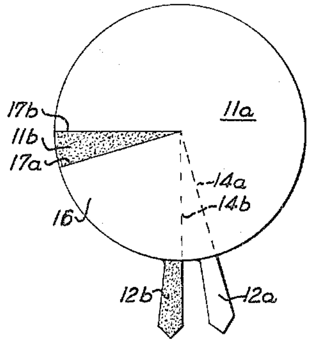
FIGURE 4 is a bottom view of the disks shown in FIG. 3 but in a completely interleaved position.
Figures 5, 6:
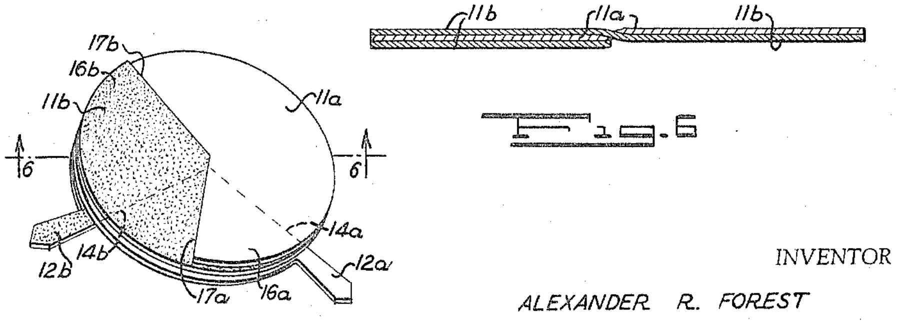
FIGURE 5 is a view in perspective showing the interleaved disks of FIG. 4, the disks being in an inverted position.
FIGURE 6 is a sectional view taken on line 6—6 of FIG. 5 and looking in the direction of the arrows.

In FIG. 3, the disk **11*a* is shown being interconnected to disk 12*a* which is identical in form and shape to disk 11*a*. The first quadrant $I^a$ of the disk 11*a* is slipped between the first and fifth quadrants $I^b$ and $V^b$ of the disk 12*a* with its locking leaf 16*a* lying below the locking leaf 16*b* of disk 11*b*. The centers of the disks are on a common axis or superimposed. The disks 11*a* and 11*b* are then in the position seen in FIG. 4. Disk 11*a* as seen in the inverted position in FIG. 4 can be rotated counterclockwise almost 360° without becoming disengaged from disk 11*b*. This is due to the fact that the body portion 13*a* is continually located between the body portion 13*b* and locking leaf 16*b* of the disk 11*b***. Thus it can be seen in what manner the locking leaf of each disk serves to hold the disks on a common axis without a center spindle or post.

If it is desired to add a third disk to the device, the first quadrant of such a disk is inserted between the first quadrant $I^a$ of disk **11*a* and the fifth quadrant $V^b$ of disk 11*b* with its own locking leaf lying below the locking leaves 16*a* and 16*b* of disks 11*a* and 11*b***. Further disks, as desired, may be added in a similar manner. Such a device having five disks is shown in FIG. 1.

It is to be understood that my device is susceptible of many modifications and variations without departing from either the crux or spirit of the invention. The disk may have a non-circular periphery which may be scalloped or calibrated. The locking leaf 16 of each disk 11 can represent a segment either substantially greater or substantially less than the locking leaf, as shown. Specifically, each locking leaf 16 can be extended 180° beyond the body portion 13 so that it defines both a fifth and sixth quadrant or the locking leaf can be extended only 45° beyond the body portion so that it defines only part of a fifth quadrant. The arrangement selected is a matter of choice related to the particular use of the device.

In addition the tabs 12 may be placed anywhere on the disks 11 and need not necessarily be located along the leading edge 15 of the body portion 13. They can be positioned along any point of the circumference of the disk 11 or they could be positioned to extend perpendicularly to either the leading edge 15 or trailing edge 17 of each disk 11. Moreover, the tabs 12 can take any shape desired. For example, if the disks 11 were utilized to advertise airline schedules and fares, the tabs could be in the form of airplanes.

The disks may be made of paper or cardboard materials, plastic materials or metals or any other suitable matter.

In operation, each disk 11 is independently rotated so as to either expose more or less of its surface area and correspondingly reduce or increase the exposed surface area of that disk lying just below the rotated disk. The disks 11 can be made of different colors to further aid visualization of the printed material on their upper and lower surfaces.

FIGURES 13–16 illustrate a display apparatus suitable for exhibiting the intertwined disks hereinabove described and further capable of displaying other types of disk arrangements wherein the disks are connected by other means such as, for example, center posts and spindles.

The illustrated display device comprises generally a base member 36 fabricated of a relatively rigid material such as wood, or the like.

Said display apparatus, moreover, comprises a sheet 38 of relatively flexible material such as plastic or the like. Sheet 38 is connected to the base member 36 at its periphery by means of an adhesive, nails, bolts, or the like. The zone in which the sheet 38 is connected to the base member 36 may be covered by a border 40 of wood or like material.

Because the sheet 38 is connected to base member 36 at the periphery thereof there is formed between these two elements a pocket 42, the purpose of which will become hereinafter apparent. Access into the pocket 42 is provided by means of an opening or slit 44 which is preferably rectilinear and extends from the center of sheet 38 to the periphery thereof.

Figure 13:
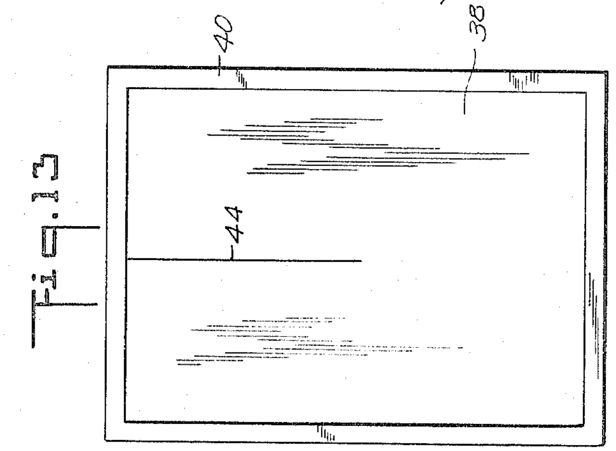
FIGURE 13 is a top plan view of a support which I provide for my display device.
Figure 16:
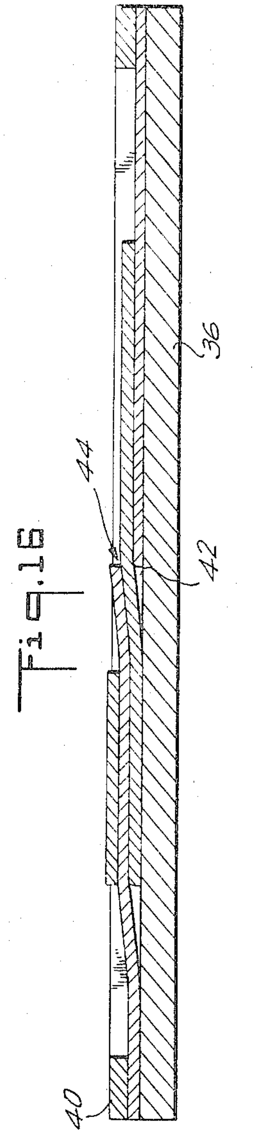
FIGURE 16 is a sectional view taken along line 16—16 in FIG. 15.

As will be appreciated from the earlier description, the invention contemplates the use of a plurality of disks each in the form of a flat helix and locked together solely by being in entwined relation. Such an arrangement, as well as other arrangements of disks employing center posts or spindles, may be readily supported in the display device of FIGS. 13–16 as shown, for example, in FIG. 15 wherein a portion of a disk 46 is shown inserted through slit 44 so that the disk and sheet 38 are entwined in each other. FIG. 13, moreover, indicates with dotted lines two additional disks 48 and 50 indicating how a plurality of disks may be appropriately supported by the illustrated display apparatus. FIGS. 13–16 illustrate one preferred form of display apparatus wherein the base member is a generally flat right quadrilateral element covered by a flat sheet which is also of right quadrilateral form, the slot 44 being vertically disposed in said sheet.

From what has been stated hereinbefore, it will be appreciated that the different disks and the sheet 38 may all preferably be of different colors.

Having thus described my invention, what I claim is:

1. A device consisting essentially of a plurality of superimposed and interleaved disks positioned on a common axis, each of said disk being independently rotatable with respect to the remaining disks and each said disk having a radial slit extending from a point on the circumference to the center thereof and a leaf portion integrally affixed to said disk along the entire length of one edge of said slit and extending below the body of said disk a substantial distance outwardly from said one edge of the slit, each said leaf portion interconnecting its associated disk with the remaining disks and lying flatly against one of the latter, whereby said disks are adapted to remain in said interleaved condition when 360 degrees of surface area of any one thereof is exposed.

2. A disklike member adapted for interconnected use with similar members, each disk having a radial slit extending from a point on the circumference to the center thereof and a leaf portion affixed in edge to edge abutting relationship to one edge of said slit and extending below the body of said disk a substantial distance outwardly from said one edge of the slit, said leaf lying flatly against said body.

3. A disklike member adapted for interconnected use with similar members comprising a pair of laminae each having a radial slit extending from a point on the circumference to the center thereof, said slits being annularly displaced from each other and the adjoining surfaces of said laminae outside the angular displacement of said slits being bonded together.

4. A disklike member adapted for interconnected use with similar members comprising a pair of concentric laminae each having a radial slit extending from a point on the circumference to the center thereof, said slits being annularly displaced from each other, the facing surfaces of the laminae except that portion between said slits being bonded together.

5. A disklike member adapted for interconnected use with similar members comprising a pair of concentric laminae each having a radial slit extending from a point on the circumference to the center thereof, said slits being annularly displaced substantially 90° from each other and the remaining 270° of the facing surfaces of the laminae being bonded together.

6. A display device comprising a generally flat base member, a sheet covering said base member and provided with a slit, said sheet and base member defining a pocket having an opening constituted by said slit, at least one disk in the form of a flat helix entwined with said sheet and extending at least partly into said pocket via said slit, and a plurality of further disks, each in the form of a flat helix, entwined with each other and with the first said disk and said sheet, said disks being locked together solely by being in entwined relation.

7. A device as claimed in claim 6 wherein said disks are concentric, each disk having leading and trailing edges extending substantially radially between the center and circumference thereof and offset by an angle greater than three-hundred and sixty degrees.

8. A device as claimed in claim 6 wherein said disks and sheet are all of different colors.

9. In combination: (1) a device comprising a plurality of superimposed and interleaved disks positioned on a common axis, each said disk being independently rotatable with respect to the remaining disks and each said disk having a radial slit extending from a point on the circumference to the center thereof and a leaf portion integrally affixed to said disk along the entire length of one edge of said slit and extending below the body of said disk a substantial distance outwardly from said one edge of the slit, each said leaf portion interconnecting its associated disk with the remaining disks, whereby said disks are adapted to remain in said interleaved condition when 360 degrees of surface area of any one thereof is exposed; and (2) a support comprising a base member, and a sheet covering said base member and peripherally connected therewith to define a pocket, said sheet being provided with a slit accommodating the penetration of at least one of the disks into said pocket.

10. Apparatus as claimed in claim 9 wherein said slit is rectilinear.

11. Apparatus as claimed in claim 10 wherein the slit extends from about the center of the sheet to about the edge thereof.

12. Apparatus as claimed in claim 11 wherein the slit is vertical.

13. Apparatus as claimed in claim 11 wherein the sheet and base member are right quadrilaterals.

14. A device consisting essentially of a plurality of superimposed and interleaved disks positioned on a common axis, each said disk being independently rotatable with respect to the remaining disks and each said disk having a radial slit extending from a point on the circumference to the center thereof, each disk including a leaf portion extending along the entire length of one edge of said slit and projecting below the body of said disk a substantial distance angularly from said one edge of the slit, each said leaf portion interconnecting its associated disk with the remaining disks, whereby said disks are adapted to remain in said interleaved condition when 360 degrees of surface area of any one thereof is exposed, each leaf portion lying flatly against one of the other disks.

15. In combination: (1) a device comprising a plurality of superimposed and interleaved disks positioned on a common axis, each said disk being independently rotatable with respect to the remaining disks and each said disk having a radial slit extending from a point on the circumference to the center thereof, each disk including a leaf portion extending along the entire length of one edge of said slit and projecting below the body of said disk a substantial distance angularly from said one edge of the slit, each said leaf portion interconnecting its associated disk with the remaining disks, whereby said disks are adapted to remain in said interleaved condition when 360 degrees of surface area of any one thereof is exposed; and (2) a support comprising a base member, and a sheet covering said base member and peripherally connected therewith to define a pocket, said sheet being provided with a slit accomdating the penetration of at least one of the disks into said pocket.

References Cited by the Examiner

UNITED STATES PATENTS

| | | | |
|---|---|---|---|
| 505,943 | 10/1893 | Fischer | 46—37 |
| 1,539,868 | 6/1925 | Roberts | 40—70 |
| 2,305,443 | 12/1942 | Pinto | 40—159 |
| 3,021,614 | 2/1962 | Rubin | 35—24 |

FOREIGN PATENTS

| | | |
|---|---|---|
| 165,956 | 5/1950 | Austria. |
| 434,310 | 8/1935 | Great Britain. |

EUGENE R. CAPOZIO, *Primary Examiner.*

WENCELSAO J. CONTRERAS, *Assistant Examiner.*